Patented July 10, 1923.

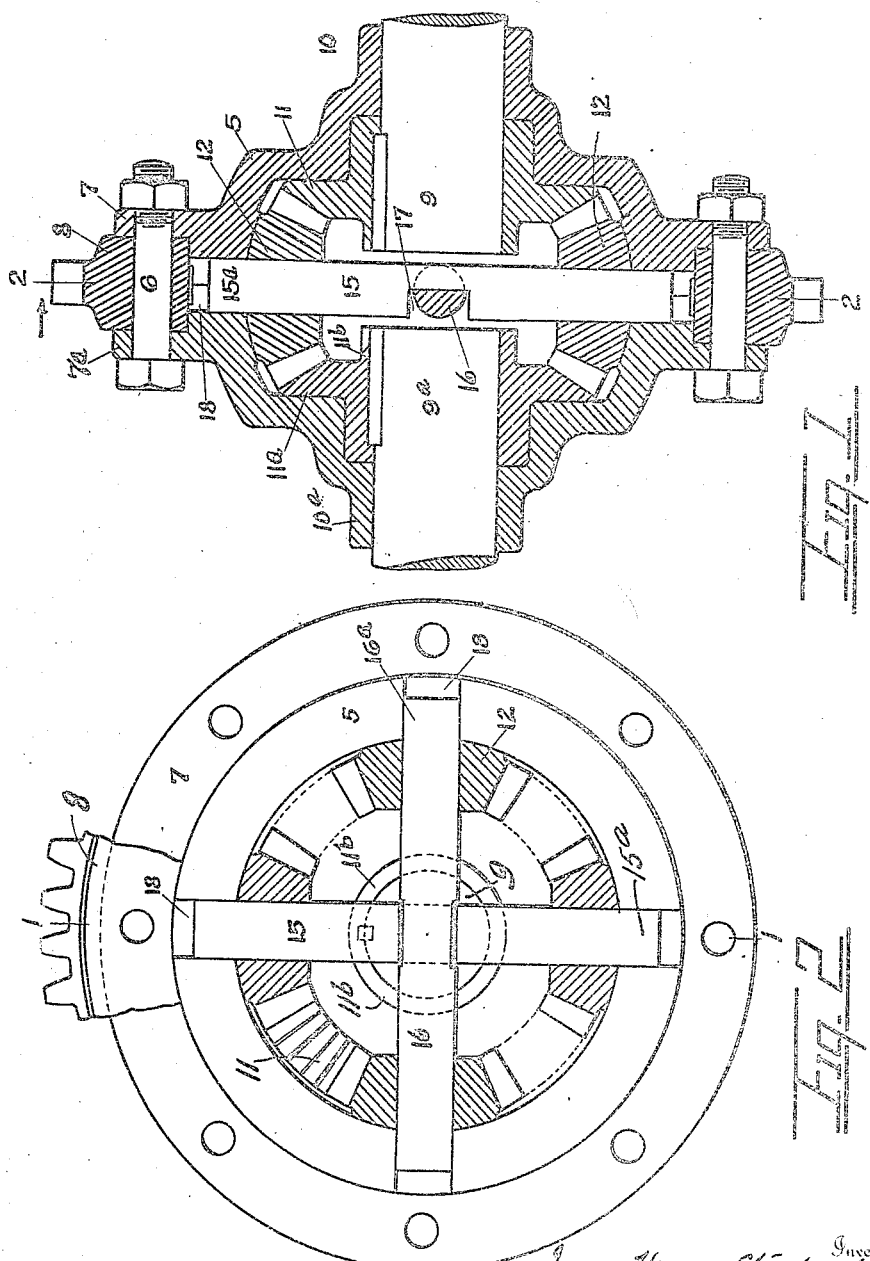

1,461,102

UNITED STATES PATENT OFFICE.

JAMES HERVEY STERNBERGH, OF READING, PENNSYLVANIA.

DIFFERENTIAL GEAR.

Application filed June 3, 1921. Serial No. 474,608.

*To all whom it may concern:*

Be it known that I, JAMES HERVEY STERNBERGH, a citizen of the United States, residing at Reading, in the county of Berks and State of Pennsylvania, have invented certain new and useful Improvements in Differential Gears, of which the following is a specification.

My invention relates to differential gear construction and my object is to provide improved pinion carrying means whereby troublesome and costly machining operations are eliminated without reducing its efficiency or strength. The improvements are fully described in connection with the accompanying drawing and the invention is clearly defined in the claim.

Fig. 1 is a longitudinal section, on the line 1—1 of Fig. 2, indicating a known type of differential gearing with my invention embodied therein. And Fig. 2 is a cross-sectional view on the line 2—2 of Fig. 1.

Referring to the drawing, 5 represents a usual driven casing, parted vertically for convenience in assembling its enclosed gears, and held in united position by bolts 6 engaging spaced circumferential flanges 7, 7ª of the respective casing parts, a driving ring gear 8 being held between said flanges by the bolts 6, all as heretofore. This circular casing is mounted in well known manner in a fixed housing and provided with bearings and a drive connection for the ring gear 8, none of which is shown because common and well understood. The inner ends 9, 9ª of the parted shaft extend into the casing from opposite sides, being rotatably supported in central sleeve extensions 10, 10ª of the latter; and upon each end within the casing is keyed a side gear 11 or 11ª, while four pinions 12, 12, 12, 12 meshing side gears produce the differential drive of the divided shaft in well known manner.

These pinions 12 have heretofore been spaced and mounted upon a "spider" having a hub portion fitted upon the inner hub extensions 11ᵇ of the side gears 11, 11ª, and radiating pinion studs, which mounting required a special casting or forging and accurate and troublesome machining.

My improved mounting, as clearly shown in the drawing, comprises two rolled bars 15, 16, cut from commercial stock, crossed at right angles and extending diametrically between the spaced inner ends 9, 9ª of the shaft. Each of these bars 15 and 16, is centrally notched at 17, as shown, so that when crossed their axes will lie in one plane, with their notched intersection at the axis of the divided shaft, and their outer ends 15ª, 16ª, held in recesses 18 in the meeting faces of the casing wall. The pinions 12, 12, 12, 12 are simply strung upon the outer portions of the crossed bars 15 and 16 upon which they freely rotate as required. The outward movement of the pinions 12 upon the bars 15 and 16 due to the centrifugal throw of the rotated casing 5, is limited by the casing wall, while inner movement thereof is ordinarily limited merely by the meshing of their bevel teeth with the side gears 11 and 11ª; though if desired the bars 15 and 16 may be provided with a stop or shoulder to prevent such inward movement of the gears.

My improved construction above described is very simple and inexpensive and under severe service has proved very substantial and effective.

What I claim is:

In differential gearing mechanism, a divided drive shaft having gear-carrying ends spaced-apart to permit the location therebetween of a radial-armed pinion carrier, a driven casing therefor provided with radial bearing-recesses, and a pinion carrier comprising two bars engagingly crossed at the shaft axis between said spaced-apart shaft ends and forming pinion-carrying arms arranged in a common plane and adapted to enter said bearing recesses.

In testimony whereof I affix my signature.

JAMES HERVEY STERNBERGH.